United States Patent [19]

Osawa et al.

[11] Patent Number: 5,116,945
[45] Date of Patent: May 26, 1992

[54] RESINOUS SUBSTANCE

[75] Inventors: Ken'ichi Osawa, Ichihara; Hisao Ikeda, Funabashi; Fumio Mizuochi; Hiroyuki Uehara, both of Ichihara, all of Japan

[73] Assignee: Nissan Chemical Industries, Ltd., Tokyo, Japan

[21] Appl. No.: 478,534

[22] Filed: Feb. 12, 1990

[30] Foreign Application Priority Data

Feb. 14, 1989 [JP] Japan .................................. 1-34681
Dec. 14, 1989 [JP] Japan .................................. 1-324446

[51] Int. Cl.⁵ .............................................. C08L 77/00
[52] U.S. Cl. ...................................... 530/215; 530/216; 525/432; 525/437; 524/767

[58] Field of Search ............... 530/215, 216; 524/767; 525/437, 432

[56] References Cited

U.S. PATENT DOCUMENTS 4,442,258  4/1984  Sunakawa et al. .................. 524/767
4,707,528  11/1987 Koizumi et al. .................... 525/432

Primary Examiner—John Kight, III
Assistant Examiner—Duc Truong
Attorney, Agent, or Firm—Oliff & Berridge

[57] ABSTRACT

A resinous substance obtained by reacting a rosin compound containing 1 to 10 equivalents of carboxylic groups per kilogram with triglycidyl isocyanurate. A process for producing it is also disclosed.

3 Claims, No Drawings

RESINOUS SUBSTANCE

BACKGROUND OF THE INVENTION

1. Field of the Invention

This invention relates to a novel resinous substance which can be used for a wide variety of applications including the preparation of electronic materials such as insulators and sealing agents, optical materials, casting materials, lamination materials, pressure sensitive adhesives, adhesives, paints, inks, and modifiers for resins.

2. Description of the Prior Art

Rosin compounds are used in inks, paints, adhesives pressure sensitive adhesives, etc. consisting mainly of rubber or acrylic resins as additives for improving their adhesion to the substrate. They are also used in paper sizes, as they have high water-repelling property. Moreover, they are used for preparing insulating materials, as they exhibit high electrical insulating property.

Natural pine rosin is a mixture of abietic acid and other compounds having backbones which are similar to that of abietic acid, and is used as the principal material for various rosin compounds. It is, however, known that a number of problems arise from the use of natural pine rosin. For example, the compounds composing natural pine rosin, such as abietic acid, generally have the diene structure and are likely to have their properties affected easily by oxygen, heat, light, etc.

Stabilized rosins which are obtained by reacting the diene structure of natural pine rosin and stabilizing it are, therefore, widely used. The known stabilized rosins include maleic rosin obtained by adding maleic anhydride to the diene structure, rosin obtained by adding fumaric acid, phenolically modified rosin obtained by adding a phenolic resin, polymerized (or dimerized) rosin obtained by dimerizing the diene structure, disproportionated rosin obtained by disproportionating the rosin-components, such as abietic acid, to form mono-enes and aromatic rings, and hydrogenated rosin obtained by hydrogenating the diene structure.

Natural pine rosin has so low a softening point that, when it is used in an adhesive, pressure sensitive adhesives, etc. consisting mainly of a rubber or acrylic resin, it greatly lowers the cohesive force and heat resistance of the adhesive, etc., though it improves its adhesive property. Therefore, a rosin compound having a higher softening point has been made by esterifying natural pine rosin using a polyhydric alcohol, such as ethylene glycol, glycerin, or pentaerithritol.

The esterified products of natural pine rosin, however, still retain the diene structure and are, therefore likely to have their properties affected by oxygen, heat, light, etc. Accordingly, it is often the case to use, as well as the esters of natural pine rosin, rosin compounds obtained by esterifying stabilized rosins, such as maleic polymerized (dimerized), disproportionated, or hydrogenated rosins.

The esterified rosin compounds having high softening points are, however, still unsatisfactory when used for modifying acrylic or rubber resins. They lower the cohesive force of the resin, though not so much as natural pine rosin or stabilized rosins do.

The rosin compounds have adhesive, water-repelling, and other properties, and are used in inks, paints, adhesives or pressure sensitive adhesives consisting mainly of rubber or acrylic resins, in sizes, etc, as hereinabove stated. However, there has hardly been any case where the rosin compounds are used in sealing, optical, casting, lamination, or other materials composed of epoxy or methacrylic resins. This is probably due to the unsatisfactory compatibility of the rosin compounds with the epoxy and methacrylic resins.

SUMMARY OF THE INVENTION

Under these circumstances, it is an object of this invention to provide a novel resinous substance which can be added to inks, paints, adhesives, pressure sensitive adhesives, etc. to improve their adhesion to the substrate, or other properties without impairing their cohesive force, heat resistance, etc.

It is another object of this invention to provide a resinous substance which is compatible with epoxy and methacrylic resins and can be added to improve the water-repelling, and other properties of sealing, casting, lamination, or other materials prepared from epoxy or methacrylic resins.

The resinous substance of this invention is obtained by reacting a rosin compound containing 1 to 10 equivalents of carboxylic groups per kilogram with triglycidyl isocyanurate (TGIC). The reaction is preferably carried out so as to combine 0.1 to 2 equivalents of carboxylic groups with one equivalent of an epoxy group.

It is still another object of this invention to provide a process for preparing a novel resinous substance.

In view of the high reactivity of the epoxy groups in TGIC with carboxylic acids, a rosin compound containing carboxylic acids is reacted with TGIC to introduce the rosin backbone into TGIC.

DETAILED DESCRIPTION OF THE INVENTION

Triglycidyl isocyanurate is an epoxy resin having an isocyanurate backbone which exhibits high heat resistance. When reacted with a rosin compound, it gives a reaction product having higher heat resistance than that of an epoxy resin prepared from bisphenol A (hereinafter referred to as "BPA epoxy resin") or an epoxy resin prepared from an aliphatic alcohol (hereinafter referred to as "aliphatic epoxy resin").

Moreover, as TGIC is a polyfunctional epoxy resin, it is possible to produce a novel resinous substance having epoxy groups by reacting TGIC with a rosin compound having carboxylic groups if the proportions in which they are reacted are appropriately selected. The reaction product possesses the properties of an epoxy resin, too. If its epoxy groups are cured, therefore, it is expected to provide an adhesive, pressure sensitive adhesives, paint, etc. having improved heat resistance and cohesive force. It will also be useful for application to the epoxy resins in the field in which no rosin compound has hitherto been used.

The appropriate proportions may be such that the rosin compound contains 0.1 to 0.7, or preferably 0.2 to 0.6, equivalent of carboxylic acid group for one equivalent of epoxy group in TGIC. If no epoxy group in the resinous substance is necessarily required, the rosin compound may be employed in such a quantity as to contain 0.7 to 2 equivalents of carboxylic groups for one epoxy equivalent, so that the epoxy groups may be decreased until they no longer have any influence, or may even be reacted completely. It is, however, desirable to use the rosin compound in such a quantity as to contain 0.7 to 1.5 equivalents of carboxylic groups for one epoxy equivalent of TGIC, since the use of the rosin compound in a larger quantity is likely to result in a large quantity of rosin compound remaining unreacted.

Although natural pine rosin, or abietic acid, which is its principal constituent, can be used as the rosin compound having carboxylic groups for the purpose of this invention, it is preferable to use maleic modified, polymerized (dimerized), disproportionated, hydrogenated, or other stabilized rosin having high coloring resistance and good thermal stability.

Any rosin compound containing 1 to 10 equivalents of carboxylic acid per kilogram can be used for preparing the resinous substance of this invention. Therefore, it is possible to use, for example, abietic acid, or disproportionated or hydrogenated rosin, each containing about 3 equivalents of carboxylic group per kilogram, a hydrolyzed product of maleically modified rosin, or rosin obtained by adding fumaric acid, each containing about 9 equivalents of carboxylic group per kilogram, or a partial ester of polymerized (dimerized) rosin containing about 1 to 2 equivalents of carboxylic group per kilogram.

The reaction may be accomplished by heating and melting TGIC, and adding an appropriate amount of a rosin compound having carboxylic groups to the molten TGIC, or by employing a catalyst, or solvent. When molten TGIC is employed, the reaction may be accomplished at a temperature of 120° to 250° C. As the reaction proceeds, the temperature may be lowered to a level of, say, 60° to 80° C., since the reaction product is usually likely to have a melting point which is lower than that of TGIC.

If a catalyst is employed for the reaction, it is possible to use, for example, an organic phosphorus catalyst such as triphenylphosphine, a tertiary amine catalyst such as benzyldimethylamine, or a quaternary ammonium salt catalyst such as tetramethylammonium chloride.

If a solvent is employed, it is possible to use, for example, an aromatic solvent such as toluene or xylene, a halogenated aromatic solvent such as chlorobenzene or dichlorobenzene, a halogenated hydrocarbon solvent such as chloroform or 1,2-dichloroethane, a ketone solvent such as methyl ethyl ketone or methyl isobutyl ketone, a sulfoxide solvent such as dimethyl sulfoxide, an amide solvent such as dimethylformamide or dimethylacetamide, a cyclic ether solvent such as tetrahydrofuran or dioxane, or an ester solvent such as butyl acetate. After all, any solvent can be used if it is inert to the reaction between epoxy groups and carboxylic acids. When a solvent is employed, the reaction temperature may be between 60° and 250° C.

The reaction may be carried out at atmospheric pressure, or at an elevated pressure which may prevail when a pressure vessel, such as an autoclave, is employed. There is no particular limitation to the pressure under which the reaction is carried out.

It is generally known that the reaction of TGIC having the formula I and carboxylic acid having the formula R—COOH yields a mixture of substances having the formulas II, III and IV, respectively. If the carboxylic acid, R—COOH, is employed in a relatively small quantity, the compound having the formula II is more likely to form, and if it is employed in a relatively large quantity, the compounds having the formulas III and IV are more likely to form.

If TGIC is reacted with abietic acid having the formula V, which is the principal constituent of natural pine rosin, there is obtained a mixture of substances having the formulas II, III and IV where the substituent R has the formula VI.

The novel resinous substance of this invention is assumed to have a structure which is similar to that of the product of reaction between abietic acid and TGIC. If the rosin compound having carboxylic groups is employed in a relatively small quantity, there is usually obtained a colorless or brown reaction product in the form of a liquid or viscous liquid, and it if is employed in a relatively large quantity, the reaction product is usually an amber-like solid.

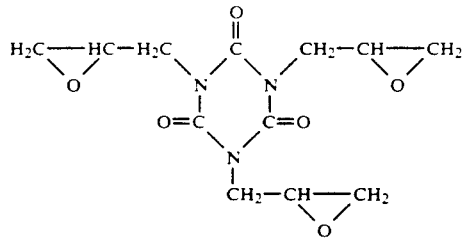

[TGIC] [I]

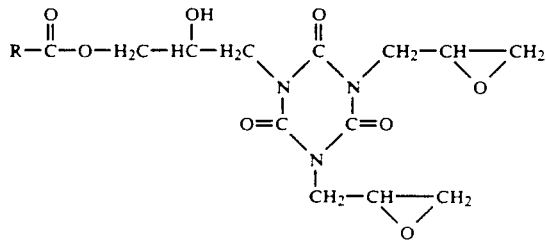

[II]

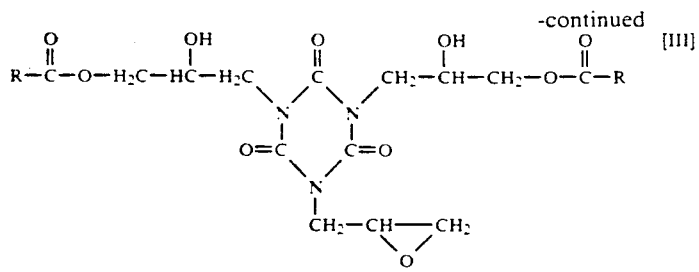

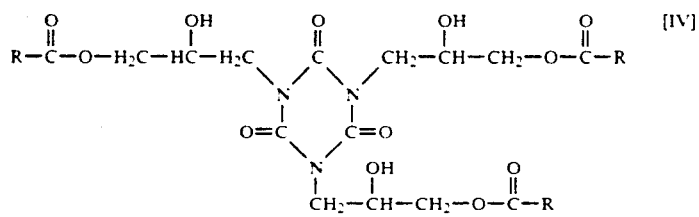

(Abietic acid)

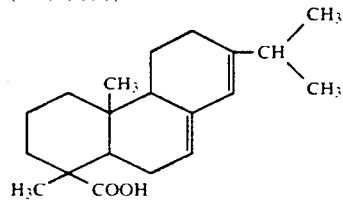

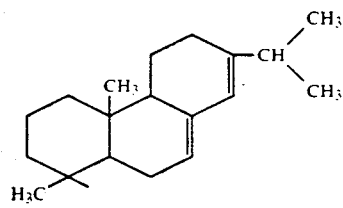

The resinous substance of this invention possesses both the heat resistance and other desirable properties of TGIC and the adhesive, water-repelling and other desirable properties of the rosin compound. Therefore, it can be used effectively in inks, paints, adhesives, pressure sensitive adhesives to improve their adhesive property, etc., while maintaining their cohesive force, heat resistance, etc.

Moreover, it has good compatibility with epoxy and methacrylic resins. Therefore, it can effectively improve the water-repelling property, etc. of sealing, casting, lamination, optical, or other materials composed mainly of epoxy resin or methacrylic resin.

The invention will now be described more specifically with reference to a variety of examples including ones of application.

EXAMPLE 1

A four-necked flask equipped with a stirrer, a thermometer and a condenser was charged with 100 g of TEPIC-S (the tradename of Nissan Chemical Industrial Co. for triglycidylisocyanurate, TGIC, of high purity having an epoxy equivalent of 100 g, i.e. containing one equivalent of epoxy group in 100 g). It was melted at 140° C., and the molten material was heated to 150° C. and stirred. Then, the flask was charged with 100 g of Foral AX (the tradename of Rika Hercules Inc. for hydrogenated rosin having an acid value of 160 mg KOH/g (rosin) and containing 0.285 equivalent of carboxylic acid group in 100 g). The rosin was reacted with TGIC for three hours. Then, the reaction system was slowly cooled, whereby an amber-like solid product was obtained. The product was found to have an epoxy equivalent of 265 g as a result of titration using perchloric acid. Its acid value was lower than the determinable limit.

EXAMPLES 2 TO 4

The process of EXAMPLE 1 was followed for reacting TEPIC-S with different rosin compounds as shown in TABLE 1. The amounts of the materials which were employed are also shown in TABLE 1. TABLE 2 shows the epoxy equivalent, acid value, and infrared absorption spectral peaks of each of the reaction products.

EXAMPLE 5

A four-necked flask having a stirrer, a thermometer and a condenser was charged with 90 g of xylene and 350 g of a rosin compound known as Bandis G-100 (the tradename of Harima Chemical Industrial Co. for disproportionated rosin having an acid value of 160 mg KOH/g (rosin) and containing 0.285 equivalent of carboxylic group in 100 g). They were stirred at 120° C. to form a homogeneous solution. The flask was further charged with 100 g of TEPIC-S and 0.45 g of tetramethylammonium chloride (TMAC) as a catalyst. The temperature was raised to 150° C. and the reaction was continued for four hours. Then, the xylene was removed from the contents of the flask by vacuum drying, whereby an amber-like solid product was obtained.

The amounts of the materials which were employed are shown again in TABLE 1. The epoxy equivalent, acid value, and infrared absorption spectral peaks of the product are shown in TABLE 2.

EXAMPLE 6

The process of EXAMPLE 5 was followed for reacting a rosin compound known as KR-610 (the tradename of Arakawa Chemical Industrial Co. for ultralight-colored rosin having an acid value of 170 mg KOH/g (rosin) and containing 0.303 equivalent of carboxylic group in 100 g) with TEPIC-S in butyl acetate as a solvent. The amounts of the materials which were employed are shown in TABLE 1, and the epoxy equivalent, acid value, and infrared absorption spectral peaks of the reaction product are shown in TABLE 2.

TABLE 1

Materials employed and amounts thereof

| Example | TEPIC-S g | Epoxy equivalent | Rosin compound, g | Carboxylic acid equivalent | Solvent g | Catalyst g |
|---|---|---|---|---|---|---|
| 1 | 100 | 1 | Floral AX: 100 | 0.285 | — | — |
| 2 | 100 | 1 | Foral AX: 100 | 0.428 | — | — |
| 3 | 100 | 1 | G-100: 100 | 0.285 | — | — |
| 4 | 100 | 1 | KR-610: 50 | 0.152 | — | — |
| 5 | 100 | 1 | G-100: 350 | 0.998 | Xylene: 90 | TMAC: 0.45 |
| 6 | 100 | 1 | KR-610: 440 | 1.333 | Butyl acetate: 54 | — |

Note
G-100: Disproportionated rosin of Harima Chemical Industrial Co. having an acid value of 160 mg (KOH/g of resin).
Foral AX: Hydrogenated rosin of Rika Hercules having an acid value of 160 mg (KOH/g of resin).
KR-610: Ultralight-colored rosin of Arakawa Chemical Industrial Co. having an acid value of 170 mg (KOH/g of resin).
TMAC: Tetramethylammonium chloride

TABLE 2

Characteristics of reaction products

| Example | Epoxy equivalent g | Acid value mg KOH/g resin | Infrared absorption spectral peaks cm$^{-1}$ |
|---|---|---|---|
| 1 | 265 | Below determinable limit | 768, 1042, 1063, 1107, 1133, 1172, 1245, 1319, 1386, 1464, 1698, 2870, 2929, 3452 |
| 2 | 480 | Below determinable limit | 768, 1042, 1062, 1108, 1131, 1172, 1244, 1319, 1386, 1464, 1698, 2870, 2930, 3451 |
| 3 | 288 | Below determinable limit | 768, 1107, 1127, 1175, 1246, 1319, 1385, 1463, 1687, 1697, 1708, 2871, 2930, 2957, 3454 |
| 4 | 172 | Below determinable limit | 768, 846, 1104, 1132, 1174, 1247, 1319, 1463, 1695, 2870, 2931, 2957, 3454 |
| 5 | Below determinable limit | 4.4 | 768, 1038, 1060, 1108, 1127, 1175, 1245, 1366, 1385, 1464, 1698, 2870, 2932, 2956, 2449 |
| 6 | Below determinable limit | 39.3 | 768, 846, 1107, 1128, 1174, 1244, 1385, 1463, 1698, 2869, 2931, 2954, 3449 |

The following is a description of several application examples in which the resinous substances of this invention were used to prepare water-dispersible pressure sensitive adhesions.

APPLICATION EXAMPLE 1

A polymerizer equipped with a stirrer, a temperature controller and a cooling tube was charged with 45 parts by weight of deionized water 0.1 part by weight of ammonium persulfate, and 0.1 part by weight of ammonium hydrogencarbonate. They were heated to a temperature of 78° to 82° C. under stirring at a speed of 200 rpm, while a small amount of nitrogen gas was supplied.

Another vessel was charged with 45 parts by weight of deionized water 0.4 part by weight of ammonium persulfate, 0.4 part by weight of ammonium hydrogencarbonate, 1 part by weight of Emulgen 930 (tradename of Kao Corp. for a nonionic surface active agent), and 0.5 part by weight of sodium lauryl sulfate. After they had been mixed, the vessel was further charged with a mixture of 60 parts by weight of 2-ethylhexyl acrylate, 38 parts by weight of ethyl acrylate, 2 parts by weight of acrylic acid and 10 parts by weight of the product of EXAMPLE 1. The contents of the vessel were stirred for 30 minutes at a speed of 800 rpm, whereby an emulsion was formed.

The emulsion was added into the polymerizer over a period of about three hours, and was thereby allowed to react with the contents of the polymerizer. The polymerizer was, then, kept at the temperature of 78° to 82° C. under stirring at 200 rpm to age the reaction product, and it was cooled to yield a water-dispersible polymer. The reaction product had a solid content of 53.2%, a pH of 3.9 and a viscosity of 55 cps.

Ammonia water was added to the polymer to adjust its viscosity to a level facilitating its use, whereby there was obtained a water-dispersible pressure sensitive adhesives containing the novel epoxy resin of this invention.

The composition of the materials which had been employed is shown again in TABLE 3. TABLE 3 shows also APPLICATION EXAMPLES 2 and 3 in which this invention was employed to modify acrylic resins, and COMPARATIVE APPLICATION EXAMPLES 1 and 2 in which commercially available epoxy and rosin-based resins were employed.

APPLICATION EXAMPLES 2 AND 3

The process of APPLICATION EXAMPLE 1 was followed for preparing water-dispersible pressure sensitive adhesives by employing acrylic monomers, surface active agents and the novel epoxy resins according to EXAMPLES 3 and 4 of this invention, as shown in TABLE 3.

COMPARATIVE APPLICATION EXAMPLE 1

The process of APPLICATION EXAMPLE 1 was followed for preparing water-dispersible pressure sensitive adhesives by employing the epoxy resin known as Epikote 828 (the tradename of Yuka Shell Epoxy for bisphenol A diglycidyl ether) and the acrylic monomers and surface active agent as shown in TABLE 3.

COMPARATIVE APPLICATION EXAMPLE 2

The process of APPLICATION EXAMPLE 1 was followed for preparing water-dispersible pressure sensitive adhesives by employing the rosin-based resin known as DS-110S (the tradename of Harima Chemicals Inc. for a stabilized rosin ester) and the acrylic monomers and surface active agent as shown in TABLE 3.

TABLE 3

Materials used in Application Examples 1 to 3 and Comparative Application Examples 1 and 2
Amounts (parts by weight)

| Materials (See Note.) | Application Example | | | Comparative Application Example | |
|---|---|---|---|---|---|
| | 1 | 2 | 3 | 1 | 2 |
| A | 10 (Product of Example 1) | 10 (Product of Example 4) | 10 (Product of Example 3) | 10 (Epkote 828) | |
| B | | | | | 10 (DS-110S) |
| C | | 0.5 | 1 | | |
| D | 1 | 2 | 0.5 | 1 | 1 |
| E | 0.5 | | | 0.5 | 0.5 |
| 2-EHA | 60 | | | 60 | 60 |
| C9A | | | 50 | | |
| EA | 38 | 25 | 48 | 38 | 38 |
| BUA | | 70 | | | |
| AA | 2 | 5 | 2 | 2 | 2 |

Note
A Epoxy resin
B Rosin-based resin (stabilized rosin ester of Harima Chemical Industrial Co.)
C Rebenol WZ (anionic surface active agent of Kao Corp.)
D Emulgen 930 (nonionic surface active agent of Kao Corp.)
E Sodium lauryl sulfate
2-EHA 2-Ethylhexyl acrylate
C9A Acrylate 900 (isononyl acrylate)
EA Ethyl acrylate
BUA n-butyl acrylate
AA Acrylic acid The water-dispersible pressure sensitive adhesives which had been obtained in each of APPLICATION EXAMPLES 1 to 3 and COMPARATIVE APPLICATION EXAMPLES 1 and 2 was applied onto a polyester film having a thickness of 25 microns and was dried at 150° C. for three minutes to form a tacky layer having a thickness of 28 to 32 microns. A specimen having a width of 25 mm was cut from the film including the tacky layer and the ball tack and peeling strength of the tacky layer were examined by the methods specified in JIS Z-0237.

The results are shown in TABLE 4. As is obvious therefrom, the pressure sensitive adhesives which had been prepared by employing the novel epoxy resins of this invention showed a high level of adhesion.

TABLE 4

| | Results of evaluation | | | | |
|---|---|---|---|---|---|
| | Application Example | | | Comparative Application Example | |
| Test | 1 | 2 | 3 | 1 | 2 |
| Ball tack | 19 | 17 | 19 | 19 | 19 |
| Peeling strength | 2930 | 3100 | 2300 | 950 | 730 |

Note
Ball tack (J. DOW method), x/32 in.
Peeling strength: 180° peeling strength, g/25 mm.
(The tacky layer was applied to a stainless steel sheet polished by water-resistant sandpaper #280)

What is claimed is:

1. A resinous substance obtained by a process consisting essentially of reacting a rosin compound containing 1 to 10 equivalents of carboxylic groups per kilogram with triglycidyl isocyanurate.

2. The resinous substance as set forth in claim 1, wherein said rosin compound and triglycidyl isocyanurate are employed in such proportions that 0.1 to 2 equivalents of carboxylic acid groups may react with one equivalent of epoxy group.

3. A process for producing a resinous substance which consisting essentially of reacting a rosin compound containing 1 to 10 equivalents of carboxylic groups per kilogram with triglycidyl isocyanurate.

* * * * *